United States Patent [19]

Smith

[11] Patent Number: 4,804,513
[45] Date of Patent: Feb. 14, 1989

[54] METHOD FOR PRODUCING A ROLLED TAB FOR A ROLL OF PLASTIC FILM

[75] Inventor: Terry B. Smith, Midland, Mich.

[73] Assignee: The Dow Chemical Company, Midland, Mich.

[21] Appl. No.: 153,115

[22] Filed: Feb. 8, 1988

[51] Int. Cl.⁴ .............................................. B29C 53/02
[52] U.S. Cl. .................... 264/500; 264/310; 264/313; 264/323; 264/339; 425/387.1; 425/402
[58] Field of Search ................. 242/15; 264/295, 310, 264/313, 320, 323, 339, 500, 510, 555; 425/387.1, 402

[56] References Cited

U.S. PATENT DOCUMENTS

| | | | |
|---|---|---|---|
| 1,972,069 | 8/1934 | Gluck | 206/58 |
| 2,096,837 | 10/1937 | Baker | 206/58 |
| 2,226,477 | 12/1940 | Moore | 229/36 |
| 2,433,445 | 12/1947 | Elsman | 206/58 |
| 2,450,033 | 9/1948 | Cohen | 206/58 |
| 2,463,375 | 3/1949 | Gluck | 206/58 |
| 2,472,521 | 6/1949 | Danenbauer | 93/3 |
| 2,573,188 | 10/1951 | Dyken | 242/66 |
| 2,624,501 | 1/1953 | Ferris | 229/3.1 |
| 2,888,181 | 5/1959 | Lincoln | 225/51 |
| 3,118,581 | 1/1964 | Finke | 225/39 |
| 3,129,870 | 4/1964 | Kirkwood | 229/51 |
| 3,549,066 | 12/1970 | Wankow | 225/25 |
| 3,927,504 | 12/1975 | Ferrister | 53/21 FW |
| 3,945,495 | 3/1976 | Carmody | 206/397 |
| 4,241,127 | 12/1980 | Lefevre | 428/177 |
| 4,243,366 | 1/1981 | Lefevre | 425/303 |

Primary Examiner—Jan H. Silbaugh
Assistant Examiner—Nick Krisch

[57] ABSTRACT

Method and apparatus adapted for use on a conveyor line to form a rolled tab in the tail end portion of a roll of plastic film wound on a core. The tail end portion initially extends around the surface of the roll to which the tail end portion adheres and terminates at a tail edge. The apparatus includes a bucket which is connected to the conveyor line for movement thereon and has a floor and wall extending therefrom. The floor of the bucket has a tractional surface supporting the roll and the wall has a substantially frictionless surface pushing the roll in the direction of the conveyor line. The apparatus further includes a drive, extending in stationary position substantially parallel to the conveyor line and having a resilient tractional surface being compressed into rotational contact with the roll, for rotating the roll. The drive rotates the roll to rub the surface of the roll against the tractional surface of the floor which separates the tail end portion from the surface of the roll and rolls the tail edge back on the tail end portion to form a rolled tab containing the tail edge.

7 Claims, 3 Drawing Sheets

METHOD FOR PRODUCING A ROLLED TAB FOR A ROLL OF PLASTIC FILM

BACKGROUND OF THE INVENTION

The present invention relates to plastic film wound on a core, and more particularly it relates to apparatus and method for forming a rolled tab in the tail end portion of the plastic film and a roll of plastic film having a rolled tab.

Commercial plastic film for consumer use is customarily manufactured by winding plastic film on a core and packaging the roll in a dispensing container for retail sale. The plastic film has a tail end portion extending around the surface of the roll and terminating at a tail edge. The plastic film is customarily manufactured with a clinging or adhesive surface to enhance its function as a wrapping material such as, for example, Saran Wrap films commonly used as household wrappings. Because of the clinging characteristic of the film, the tail end portion sticks to the surface of the roll making it difficult to identify and grasp the tail edge in order to separate the tail end portion from the surface of the roll without tearing it. The need for finding the tail edge of the film on the roll of plastic film and starting to unwind it without tearing has been long recognized, particularly with plastic film having considerable cling. Hence, roll-starting features have been used in the past to facilitate peeling the tail end portion of the film away from the surface of the roll.

One technique employed prior to the present invention involved applying a foreign substance to the tail end portion of the plastic film to prevent sticking, such as, for example. starch dust or wax. Such foreign substances or coatings, however, are difficult to apply to the film at normal conveyor speeds and do not survive extreme warehouse storage temperatures. Solvents have also been applied to the tail end portion of the film to induce curling in the tail end portion. The solvents, however. are volatile and difficult to use in-line. The most common technique involves the use of heating apparatus located in-line to emboss a pattern in the tail edge of the film to distinguish it from the rest of the film and reduce sticking of that portion to the surface of the roll. Embossing the plastic film at high conveyor speeds, however, is difficult because the plastic film is relatively fragile and susceptible to breaking upon repeated contact with the embossing plate. Furthermore. the embossed portion of the film must be precisely synchronized with cutting apparatus that forms the tail edge in the embossed portion of the film. Maintaining adequately precise temperature control is also difficult because the film will tear if the plate is too hot and will not be sufficiently embossed if the plate is too cold.

Accordingly, there is a need for a roll-starting feature and, more specifically, one that is capable of being formed in-line without the application of a foreign substance or heat and without the need for complex electronic synchronization.

SUMMARY OF THE INVENTION

The present invention meets these needs by providing apparatus adapted for use on a conveyor line to form a rolled tab in the tail end portion of plastic film wound on a roll of plastic film moving on the conveyor line. The tail end portion initially extends circumferentially around the surface of Ihe roll to which the tail end portion adheres and terminates at a tail edge. The apparatus comprises a bucket which is connected to the conVeyor line for movement thereon and has a floor and wall extending therefrom. The floor of the bucket has a tractional surface supporting the roll and the wall has a substantially frictionless surface pushing the roll in the direction of the conveyor line. The apparatus further comprises drive means, extending in a stationary position substantially parallel to the conveyor line and having a resilient tractional surface being compressed into rotational contact with the roll. for rotating the roll. The drive means rotates the roll to rub the surface of the roll against the tractional surface of the floor in the same direction that the tail end portion initially extends along the surface of the roll. As a result, the tractional surface of the floor separates the tail end portion from the surface of the roll and rolls the tail edge back on the tail end portion upon successive revolutions of the roll to form a rolled tab containing the tail edge. The apparatus might further comprise means, extending in a stationary position substantially parallel to the conveyor line, for blowing air tangentially along the circumferential surface of the roll and against the tail end portion on successive revolutions to assist in separating and rolling the tail end portion of the plastic film.

The present invention further meets these needs by providing a method for forming a rolled tab in the tail end portion of a roll plastic film wound on a core. The roll is propelled along a resilient tractional surface to rotate the roll in the same direction that the tail end portion initially extends along the surface of the roll. The roll is then pressed between the resilient tractional surface and a diametrically opposed moving contact position with a force of sufficient magnitude to compress the resilient tractional surface to form an arc of contact of sufficient length with the roll to maintain traction therebetween. The rotating surface of the roll is then rubbed at the moving contact position while maintaining the traction between the roll and the resilient tractional surface to separate the tail end portion from the surface of the roll and roll the tail edge back on the tail end portion upon successive revolutions of the roll to form a rolled tab containing the tail edge.

The product of the method and apparatus is a roll of plastic film which comprises a core and plastic film wound on the core. The plastic film has a clinging surface and a tail end portion on the surface of the roll wherein the tail end portion terminates at a tail edge. The tail edge is rolled back on the tail end portion to form a rolled tab containing the tail edge. As a result, the rolled tab facilitates identifying and grasping the tail edge to initiate use of the roll.

Accordingly. it is an object of the present invention to provide a roll-starting feature to make it easier to peel the tail end portion of the film away from the surface of the roll; to provide a roll-starting feature without applying a foreign substance or heat to the tail end portion of the film; and, to provide a roll-starting feature without using complex electronic synchronization equipment. Other objects and advantages of the invention will be apparent from the following description, the accompanying drawings, and the appended claims.

DETAILED DESCRIPTION OF THE INVENTION

Figure 1:
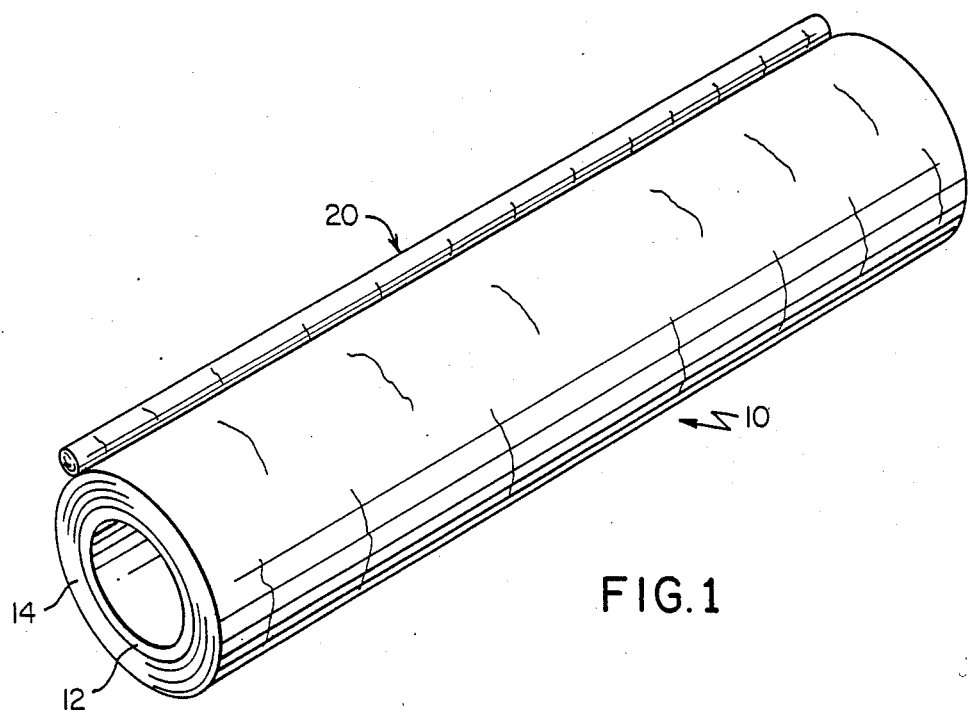
FIG. 1 is a perspective view of a roll of film and a rolled tab formed in the tail end portion of the film in accordance with the present invention.
Figure 2:
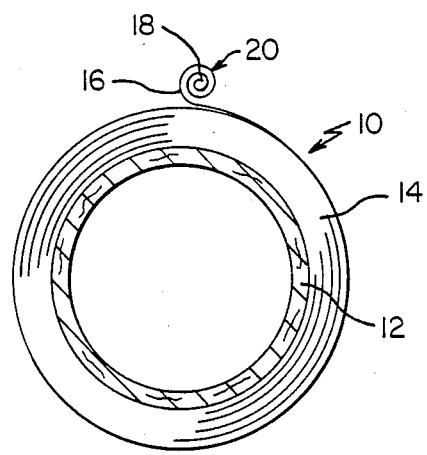
FIG. 2 is a cross sectional, end view of the roll of film of FIG. 1.

Referring to FIGS. 1 and 2, a roll of plastic film is indicated generally at 10 and comprises a paperboard core 12 and layers of plastic film 14 wound thereon. The plastic film 14 has a tail end portion 16 terminating at a tail edge 18. Initially, the tail end portion 16 of the plastic film 14 extends circumferentially around the roll 10 and adheres to the surface of the roll 10. The apparatus of the present invention, however, rolls the tail edge 18 back on the tail end portion 16 to form a rolled tab indicated generally at 20 which contains the tail edge 18. The rolled tab 0 is the roll-starting feature that facilitates identifying and grasping the tail edge 18.

The invention is broadly applicable to known synthetic resinous films or wrapping materials which exhibit a high degree of clinging, whether from inherent characteristics, added clinging agents, or static charge. The plastic film 14 can be, for example, household films made of the vinylidene chloride copolymers (Saran Wrap films), polyvinyl chloride films, or film made of polyethylene homopolymers and copolymers, as long as the plastic film 14 exhibits the clinging characteristic. The present invention utilizes this clinging charateristic to form the rolled tab 20. When the tail end portion 16 is rolled back on itself in a direction opposite the direction that the plastic film 14 is wrapped on the roll 10, the partially rolled tab 20 holds together during successive revolutions of the roll 10 because of the clinging characteristic. Thus, a roll-starting feature is formed without applying a foreign substance to the film 14 or heating the film 14 and without complex electronic synchronizing equipment. The tail edge 18 is typically rolled back about three revolutions, but one full revolution is sufficient. The rolled tab 20 typically is formed from about 1.0 to 1.25 inches of the tail end portion 16 of the film 14 and has a diameter which is typically about 1/16 inch. Because of the clinging characteristic, the rolled tab 20 maintains this shape and does not collapse from vibration when the rolls 10 ar transported to consumer markets.

The rolls 10 described herein are packaged within standard, consumer-type dispensing cartons, such as for example, trunk-lid style cartons and conventional flap lid style cartons. Trunk-lid style cartons are shown in various forms in U.S. Pat. Nos. 2,096,837, 2,226,477, 3,118,581, 3,129,870 and 3,549,066, and the conVentional flap-lid style carton is shown in various forms in U.S. Pat. Nos. 1,972,069, 2,433,445, 2,463,375, 2,472,521, 2,624,501, and 2,888,181. The disclosures in these patents are incorporated herein by reference.

Figure 3:
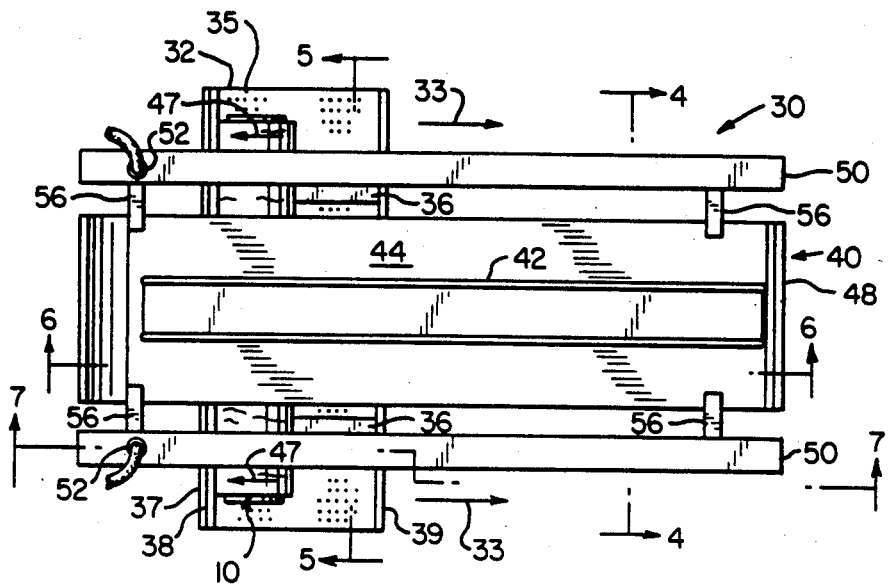
FIG. 3 is a schematic plan view of apparatus for forming the rolled tab on the roll of film in accordance the present invention.
Figure 5:
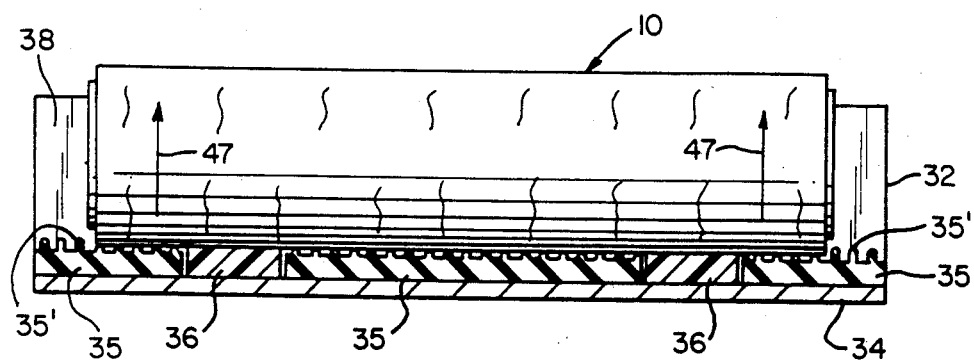
FIG. 5 is a cross sectional end view of the roll in a bucket of the apparatus of FIG. 3 taken along the reference line 5—5.
Figure 6:
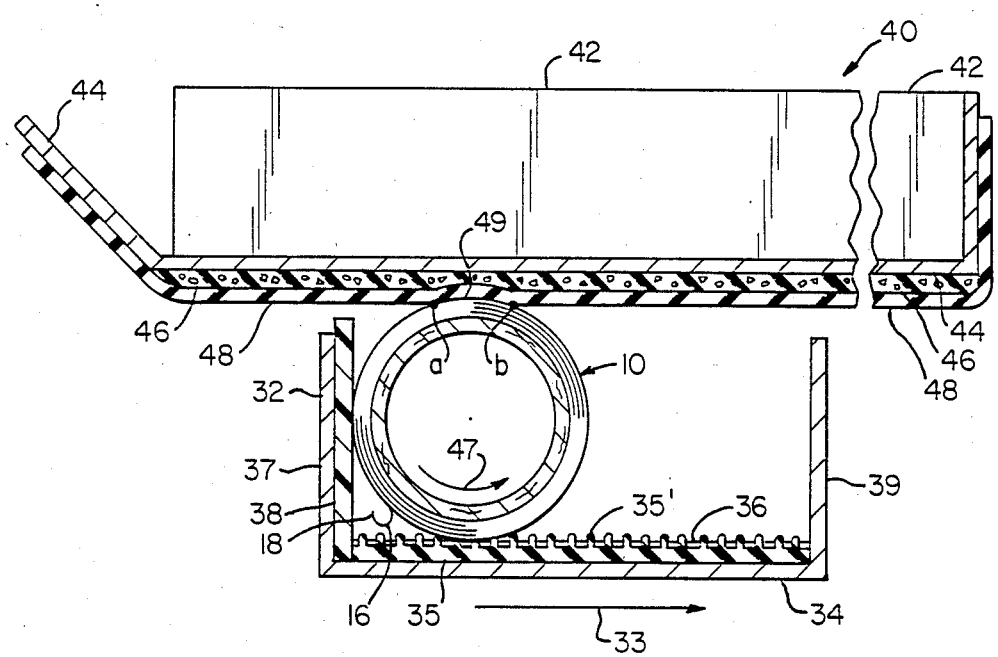
FIG. 6 is a side view of the drive bar assembly of the apparatus of FIG. 3 taken along the line 6—6; and, FIG. 7 is cross sectional, side view of the air manifold of the apparatus of FIG. 3 taken along the line 7—7.

The process of the present invention can be carried out by the apparatus schematically illustrated in FIG. 3 and indicated generally at 30. Referring also to FIGS. 5 and 6, the apparatus 30 comprises a bucket 32 connected to a conveyor line (not shown) for transporting the roll 10 therein and in a direction 33 indicated by arrows. The bucket 32 has a floor 34, an upstream wall 37 extending substantially perpendicular from the upstream end of the floor 34 and a downstream wall 39 extending substantially perpendicular from the downstream end of the floor 34. The inside surface of the upstream wall 36 is covered with a Teflon (polytetrafluoroethylene) panel 38 secured thereto by screws, glue or other suitable securing material. The inside surface of the Teflon panel 38 has a substantially frictionless surface for pushing the roll 10 in the direction 33 of the conveyor line. The floor 34 of the bucket 32 is covered with a rubber pad 35 having a knobby-tread surface 35' and two Teflon pads 36 aligned parallel to each other in the direction 33 of the conveyor movement. The Teflon pads 36 extend from the Teflon panel 38 to the downstream wall 39 and are equidistant from the center line of the bucket 32 to provide a frictionless support for the roll 10. The tips of the knobby-tread surface 35' extends slightly above the surface of the Teflon pads 36 by about for example 0.004 inch and provide a tractional surface for rubbing the surface of the roll 10 while the roll 10 rotates freely on the surface of the Teflon pads 36 against the inside surface of the Teflon panel 38.

Figure 4:
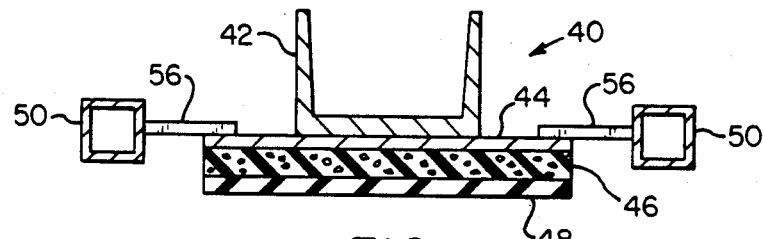
FIG. 4 is a cross sectional, end view of the drive bar assembly and air manifold of the apparatus of FIG. 3 taken along the reference line 4—4.

The apparatus 30 further comprises drive means, extending in a stationary position substantially parallel to the convey or line and having a resilient tractional surface being compressed into rotational contact with the roll 10, for rotating the roll 10 to rub the surface of the roll 10 against the tractional surface 35 of the rubber pad 35 in the same direction that the tail end portion 16 initially extends along the surface of the roll 10. Referring more specifically to FIGS. 3, 4, and 6, the drive means can be a drive bar assembly indicated generally at 40. The drive bar assembly 40 comprises a drive bar 42, a metal plate 44 extending at least the full length of the drive bar 42 and having one face secured thereto, a strip of foam rubber 46 covering the other face of the metal plate 44 and cemented thereto, and a rubber belt 48 covering the foam rubber 46. The drive bar 42 can be, for example, an aluminum channel bar having a length approximately equal to 3 to 4 times the circumference of the roll 10 of plastic film 14. The drive bar 42 extends in a stationary position substantially parallel to the conveyor line and longitudinally strengthens the metal plate 44 which presses the rubber belt 48 against the roll 10 to provide a resilient tractional surface. The rubber belt 48 can be, for example, a rubber material having a knobby-tread surface similar to that of the rubber pad 35. When the metal plate 44 presses the rubber belt 48 against the roll 10, the foam rubber 46 is compressed therebetween so that the rubber belt 48 forms an arc of rotational contact 49 with the roll 10 extending from point (a) to point (b).

In operation, the bucket 32 transports the roll 10 under the stationary drive bar assembly 40 in contact with the rubber belt 48 which rotates the roll 10 in the direction 47 indicated by arrows. The roll 10 rotates on the surface of the Teflon pads 36 against the Teflon panel 38 and the surface of the roll 10 rubs against the knobby-tread surface 35' of the rubber pad 35 in the same direction that the tail end portion 16 initially extends along the surface of the roll 10. As a result, the tractional, knobby-tread surface 35' separates the tail end portion 16 from the surface of the roll 10 and rolls the tail edge 18 back after one revolution as shown in FIG. 6. The tractional surface 35' continues to roll back the tail end portion 16 on itself upon successive revolutions to form the rolled tab 20. Although the partially rolled tab 20 is flattened each time it is rolled against the rubber belt 48 and the Teflon panel 38, the plastic film 14 is sufficiently resilient so that the rolled tab 20 returns to its cylindrical shape after being flattened. The drive bar assembly 40 provides enough pressure to the roll 10 so that the arc of rotational contact 49 is of sufficient length to provide enough traction to overcome the rubbing force of the tractional surface 35' without substantial slippage. It has been found that the requisite pressure depends upon the width of the metal plate 44, the foam rubber 46, and the rubber belt 48, which should be approximately ½ of the axial length of the roll 10 so that enough pressure can be applied without deforming the roll 10.

Figure 7:
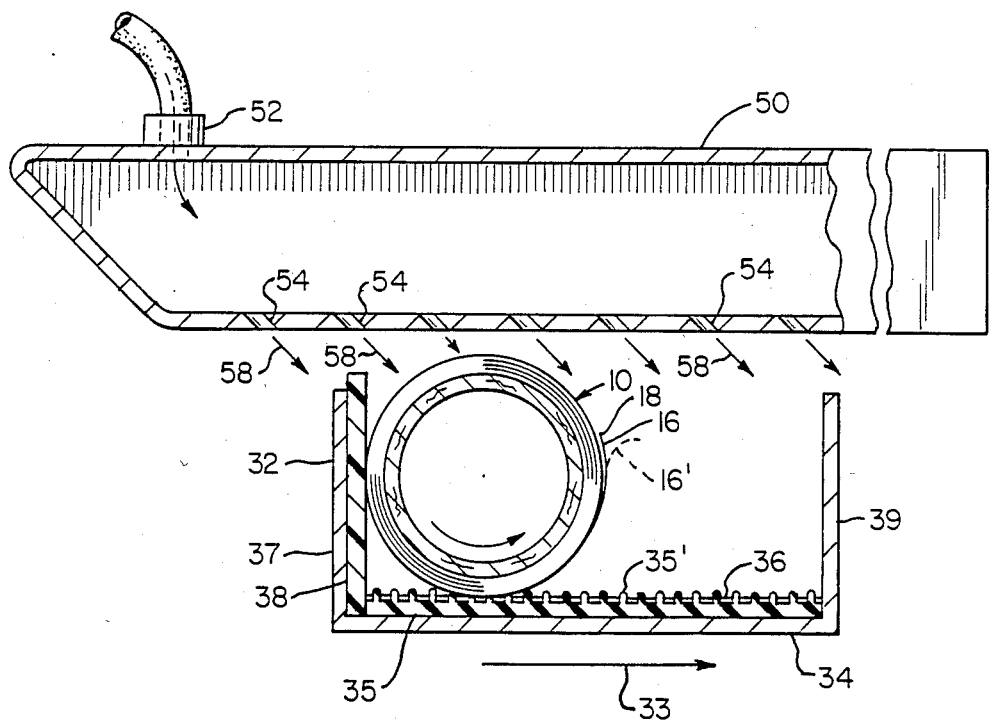

The tips of the knobby-tread surface 35' are intended to grab the tail edge 18 of the plastic film 14 as the roll 10 is rotated inside the bucket 32. The apparatus 30 may also comprise means for blowing air tangentially along the circumferential surface of the roll 10 and against the tail end portion 16 on successive revolutions to assist in separating and rolling the tail end portion 16 of the plastic film 14. Such means for blowing can be an air manifold 50 as shown in FIGS. 3, 4 and 7. The air manifold 50 can be, for example, a square steel tube sealed at both ends and having an inlet 52 for receiving compressed air and a plurality of outlets 54 axially aligned along the wall of the tube to blow air on the circumferential surface of the roll 1 while it rotates along the rubber belt 48 in the direction indicated by the arrows 47. In the preferred embodiment, two air manifolds 50 are used and are supported over each end of the roll 10 by brackets 56 secured to the metal plate 44 so that they extend substantially parallel to the conveyor line. The outlets 54 are angled, at approximately 30° from the surface of the manifold 50, to direct jets of air 58 qenerally downstream in the direction 33 of the conveyor line against the tail end portion 16 of the plastic film 14. As the roll 10 rotates along the rubber belt 48. the jets of air 58 hit the tail edge 18 of the tail end portion 16 to separate the tail end portion 16 from the surface of the roll 10 as indicated at 16'. The air jets 58 assist in rolling the tail end portion 16 upon successive revolutions of the roll 10 to form the rolled tab 20.

The method of the invention thus includes the steps of propelling the roll along a resilient tractional surface to rotate the roll in the same direction that the tail end portion initially extends along the surface of the roll, pressing the roll between the resilient tractional surface and a diametrically opposed moving contact position with a force of sufficient magnitude to compress the resilient tractional surface to form an arc of contact of sufficient length with the roll to maintain traction therebetween, and rubbing the rotating surface of the roll at the moving contact position while maintaining traction between the roll and the resilient tractional surface to separate the tail end portion from the surface of the roll and roll the tail edge back on the tail end portion upon successive revolutions of the roll to form the rolled tab containing the tail edge. The method may further comprise the step of blowing air tangentially and circumferentially along the rotating surface of the roll and against the tail end portion of the film on successive revolutions to assist in separating and rolling the tail end portion of the film.

Having described the invention in detail and by reference to preferred embodiments thereof, it will be apparent that other modifications and variations are possible without departing from the scope of the invention defined in the appended claims.

What is claimed is:

1. A method for forming a rolled tab in the tail end portion of a roll of plastic film wound on a core, the tail end portion initially extending circumferentially around the surface of the roll to which the tail end portion adheres and terminating at a tail edge, the method comprising the steps of:

propelling the roll along a resilient tractional surface to rotate the roll in the same direction that the tail end portion initially extends along the surface of the roll;

pressing the roll between the resilient tractional surface and a diametrically opposed moving contact position with a force of sufficient magnitude to compress the resilient tractional surface to form an arc of contact of sufficient length with the roll to maintain traction therebetween; and, rubbing the rotating surface of the roll at the moving contact position while maintaining the traction between the roll and the resilient tractional surface to separate the tail end portion from the surface of the roll and roll the tail edge back on the tail end portion upon successive revolutions of the roll to form a rolled tab containing the tail edge.

2. A method as recited in claim 1, wherein the roll is propelled by pushing the rotating surface of the roll radially inwardly with a substantially frictionless surface and parallel to the resilient tractional surface.

3. A method as recited in claim 1, wherein the rotating surface is pressed at two axial positions along the axial length of the roll and rubbed along the remaining portion of the axial length.

4. A method as recited in claim 1, wherein the rotating surface of the roll is rubbed along the full axial length of the roll.

5. A method as recited in claim 4, wherein the arc of contact extends centrally along about one-half of the axial length of the roll.

6. A method as recited in claim 1, further comprising blowing air tangentially and circumferentially along the rotating surface of the roll and against the tail end portion of the film on successive revolutions to assist in separating and rolling the tail end portion of the film.

7. A method as recited in claim 6, wherein the arc of contact extends centrally along about one-half the axial length of the roll and air is blown at both axial ends of the roll.

* * * * *